United States Patent
Hoyt et al.

(10) Patent No.: US 7,851,775 B2
(45) Date of Patent: Dec. 14, 2010

(54) GEAR-TYPE DRINK-O-METER TO MONITOR FLUID CONSUMPTION

(75) Inventors: Reed Wasson Hoyt, Framingham, MA (US); Scott James Montain, Holliston, MA (US); Michael H. Wollowitz, Chatham, NY (US); Matthew Stevens Hickcox, Groton, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 731 days.

(21) Appl. No.: 11/537,456

(22) Filed: Sep. 29, 2006

(65) Prior Publication Data

US 2007/0090296 A1    Apr. 26, 2007

Related U.S. Application Data

(60) Provisional application No. 60/721,530, filed on Sep. 29, 2005.

(51) Int. Cl.
   *G01F 1/28*      (2006.01)
   *G01F 15/00*     (2006.01)
   *G01F 23/00*     (2006.01)
(52) U.S. Cl. ............. 250/577; 250/231.15; 73/861.77
(58) Field of Classification Search .......... 250/577, 250/231.13–231.18; 73/861–272 A
   See application file for complete search history.

(56) References Cited

U.S. PATENT DOCUMENTS

| | | | | |
|---|---|---|---|---|
| 3,291,059 A | * | 12/1966 | Werra | 418/179 |
| 4,184,808 A | * | 1/1980 | Cobb | 417/348 |
| 4,393,724 A | * | 7/1983 | Werkmann et al. | 73/861.91 |
| 4,489,616 A | * | 12/1984 | Priddy | 73/861.79 |
| 4,815,318 A | * | 3/1989 | LoPresti | 73/261 |
| 4,856,427 A | * | 8/1989 | Gasparrini | 101/366 |
| 5,668,327 A | * | 9/1997 | Amemori et al. | 73/861.77 |
| 5,747,703 A | * | 5/1998 | Plisson et al. | 73/861.77 |
| 6,206,666 B1 | * | 3/2001 | Steinrock et al. | 418/110 |

(Continued)

OTHER PUBLICATIONS

OMEGA Technologies, Mechanical Flowmeters, Transactions in Measurement and Control, 1999, pp. 34-45, vol. 4, Putnam Publishing Co. and OMEGA Press.

(Continued)

*Primary Examiner*—John R Lee
(74) *Attorney, Agent, or Firm*—Elizabeth Arwine (57) ABSTRACT

An apparatus for monitoring the consumption of fluid by a user, particularly fluids being drank from a container. The apparatus may be used with wide variety of container types. The fluid monitoring unit uses a pair of gears in rotational engagement with each other such that fluid passes around them and rotation of at least one gear is indicative of fluid consumption. The gears in at least one exemplary embodiment are arranged to have low frictional resistance with respect to each other and their respective axles such that the gears quickly and easily rotate and over a wide fluid flow range. This allows the apparatus to accurately and consistently monitor fluid flow from very low flow rates to high flow rates and therefore provide very reliable consumption information. The apparatus in one exemplary embodiment includes an electromagnetic drinking straw embodiment that allows a user to monitor the consumption of fluids from virtually any container type.

22 Claims, 5 Drawing Sheets

U.S. PATENT DOCUMENTS

| | | | |
|---|---|---|---|
| 6,212,959 B1 | 4/2001 | Perkins | |
| 6,252,494 B1 | 6/2001 | Howell | |
| 6,411,909 B1 | 6/2002 | Charrier et al. | |
| 6,644,947 B2* | 11/2003 | Cavanaugh | 418/206.5 |
| 6,739,205 B2* | 5/2004 | Vun Cannon | 73/861.77 |
| 6,759,969 B2* | 7/2004 | Lund | 340/870.02 |
| 7,533,783 B2* | 5/2009 | Choi et al. | 220/714 |
| 2002/0129663 A1* | 9/2002 | Hoyt et al. | 73/861.79 |
| 2002/0159906 A1* | 10/2002 | Phallen et al. | 418/132 |
| 2003/0175141 A1* | 9/2003 | Cavanaugh | 418/206.5 |
| 2005/0182356 A1* | 8/2005 | Dixon | 604/77 |
| 2007/0090296 A1* | 4/2007 | Hoyt et al. | 250/357.1 |
| 2007/0098576 A1* | 5/2007 | Horng et al. | 417/420 |

OTHER PUBLICATIONS

OMEGA Technologies, Electronic Flowmeters, Transactions in Measurement and Control, 1999, pp. 46-57, vol. 4, Putnam Publishing Co. and OMEGA Press.

* cited by examiner

GEAR-TYPE DRINK-O-METER TO MONITOR FLUID CONSUMPTION

I. CROSS-REFERENCE TO RELATED APPLICATIONS

This application claims the benefit of U.S. Provisional Patent Application Ser. No. 60/721,530 filed Sep. 29, 2005, incorporated herein by reference.

II. FIELD OF THE INVENTION

The invention relates to an apparatus and system for tracking and monitoring the fluid intake of a user over a period of time.

III. BACKGROUND OF THE INVENTION

Personal management of fluid consumption is important in a wide variety of circumstances. A variety of physiological and medical problems can arise with inappropriate fluid intake. For example, under-hydration increases the risk of thermal and cardiovascular strain and heat illness, reduces heat tolerance, reduces aerobic exercise capacity and performance, and possibly increases risk of infection. Gross over-drinking can lead to hyponatremia (low blood sodium levels) or clinical problems in some patient groups such as those undergoing hemodialysis. In addition, fluid intake management takes on nutritional and clinical importance when water containing micronutrients such as salt, or macro-nutrients such as carbohydrates, are being consumed. The ability to titer or control the consumption of pharmacologically active fluids to achieve a desired outcome could have significant clinical value.

Currently, quantifying the pattern and amount of fluid consumed over time by an individual is typically a tedious and inaccurate process. One approach is to ask individuals to only drink from a given personal container, to keep track of fluid consumed from that container, and to carefully make logbook records of the date, time, and amount of liquid consumed. The volume consumed is derived by reading the liquid level from graduations on a fluid container before and after drinking and calculating the difference by mental arithmetic. This approach is difficult under low-light conditions, and incorrect logbook entries are common.

Another problem presented by currently available devices, is inaccurate or inconsistent measurements, particularly at very low flow rates. Often at low flow rates, similar to rates produced by small or gentle sips, the amount of fluid consumed is insufficient to fully engage the measurement apparatus. For example, in many currently gear or turbine type metering systems, very low fluid consumption fails to turn the gear or turbine. In these instances, the fluid fails to properly turn the gear or turbine and simple flows through or past the measurement apparatus. This leads to inaccurate fluid measurement.

IV. SUMMARY OF THE INVENTION

An important object of at least one exemplary embodiment of the invention is to provide a simple, personal fluid measurement system that accurately determines the amount and timing of the fluid intake by the user and displays the relationship of fluid consumed to pre-determined fluid requirements.

An object of at least one exemplary embodiment of the invention is to accurately determine the fluid remaining in a container containing a known initial volume and to display that "fluid gauge" information to the user.

Some advantages and features of at least one exemplary embodiment of the invention include an accurate measurement of the date, time, and the volume of liquid consumed by the user; the ability to store data related to the amount and timing of fluid consumption for later retrieval and evaluation; when used in conjunction with a container of known volume, such as a canteen, an accurate display of the fluid remaining in the container can be provided; and the device can be programmed to provide a visual, auditory, or tactile signal to indicate whether or not the user is under, meeting, or above a given schedule of fluid consumption.

Further objects, features and advantages of the invention will become apparent from the following detailed description taken in conjunction with the following drawings.

V. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention, but is used to illustrate the output of light and its reflection if any.

VI. DETAILED DESCRIPTION OF THE INVENTION

The present invention, referred to as a Gear-Type Drink-O-Meter (GT-DOM) fluid monitoring unit, is an electromechanical measurement system that accurately measures water or fluid consumed from a container. The container may include a variety of closed or open containers, including drinking glasses/cups, beverage containers, canteens, sports bottles, hydrations packs, and the like. The output from the GT-DOM device, that is, consumption information, can be stored and analyzed when the GT-DOM is paired with a processor (or other processing device) with memory. For example, fluid consumption may be compared to preset values of required water or fluid intake during each hour of a 24 hour period for the purposes of defining drinking behavior or informing the user of over- or under-drinking for a given circumstance. The GT-DOM has the capability of detecting when a drink is taken by the user. When a drink is taken, the time and the volume consumed are stored in a non-volatile memory in at least one exemplary embodiment. The GT- DOM can also be programmed to provide a visual, auditory, or tactile signal to the user to indicate the user's fluid consumption levels. These levels may be based on a variety of settings, including defaults, presets, or prescribed amounts. This information can later be downloaded for study or can immediately be used to supply consumption versus time information to personal and local area data networks.

The GT-DOM provides very accurate and consistent flow measurements over a wide flow range, from very low flow rates to high flow rates. The design of the GT-DOM affords acceptable precision, resistance to jamming, and requires very low power consumption. In at least one exemplary embodiment of the invention, the GT-DOM is used with a container of a known volume. When used with a container of known volume, the GT-DOM can determine the amount of water remaining in the container and display this information to the user through an indicator or display, such as an LED visual display or a LCD screen. This information will inform the user if the container is, for example, full, ¾ full, ½ full, ¼ full or is less than ⅛ full in one exemplary embodiment as a "fluid gauge". The LED would indicate the information using different patterns of LEDs to represent different fluid levels or alternatively providing an indication when consumption should occur based on standards.

Figure 1:
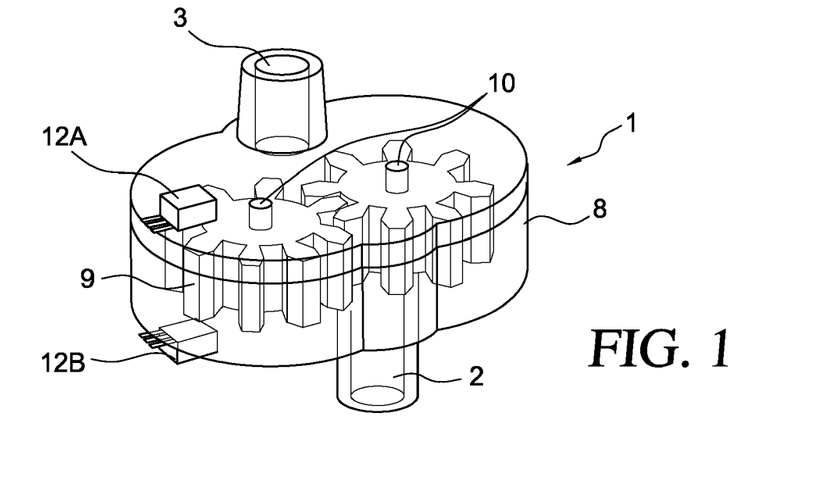
FIG. 1 illustrates an exemplary embodiment according to the invention.

FIG. 1 illustrates an exemplary embodiment of the fluid monitoring unit 1 of the present invention. The fluid monitoring unit 1 includes a housing 8 including inlet 2 and outlet 3 through which fluid flows. The interior of the housing 8 contains two gears 9 disposed in interlocking fashion on separate and spaced apart parallel axles 10. The fluid flows into the housing through inlet 2 and acts to rotate the gears 9 while passing towards the outlet 3. The rotation of the gears 9 may then be detected by sensors 12A, 12B, which may be part of housing 8 and/or gears 9. The fluid monitoring unit 1 may be utilized with or incorporated into various fluid flow systems such that the fluid passing through the system may be monitored. These functions will be described in greater detail in the discussion below.

Figure 2:
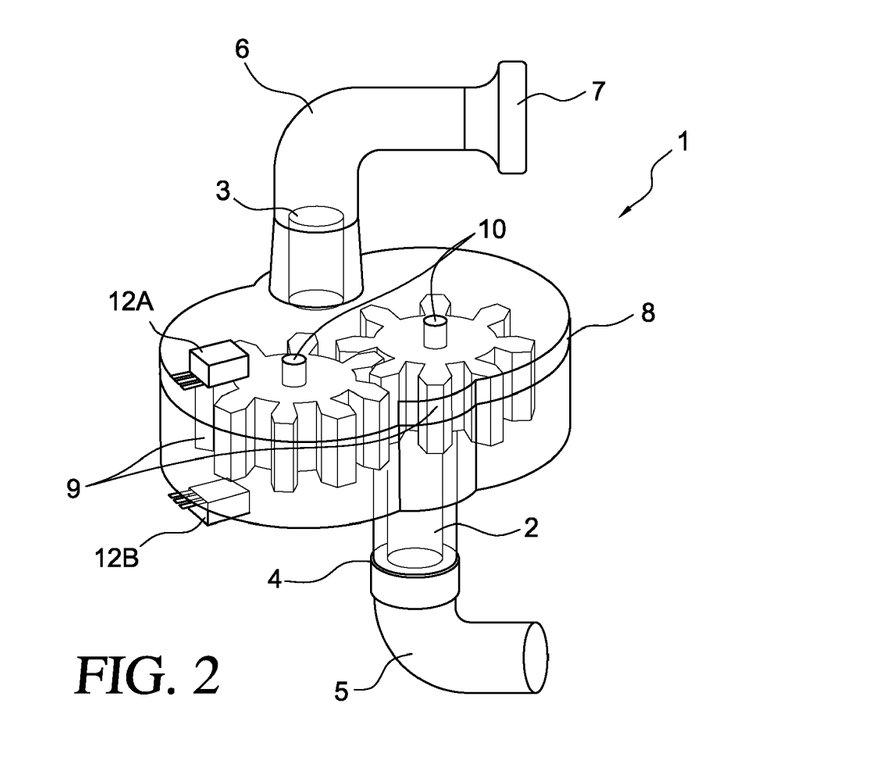
FIG. 2 illustrates an exemplary embodiment according to the invention.
Figure 3:
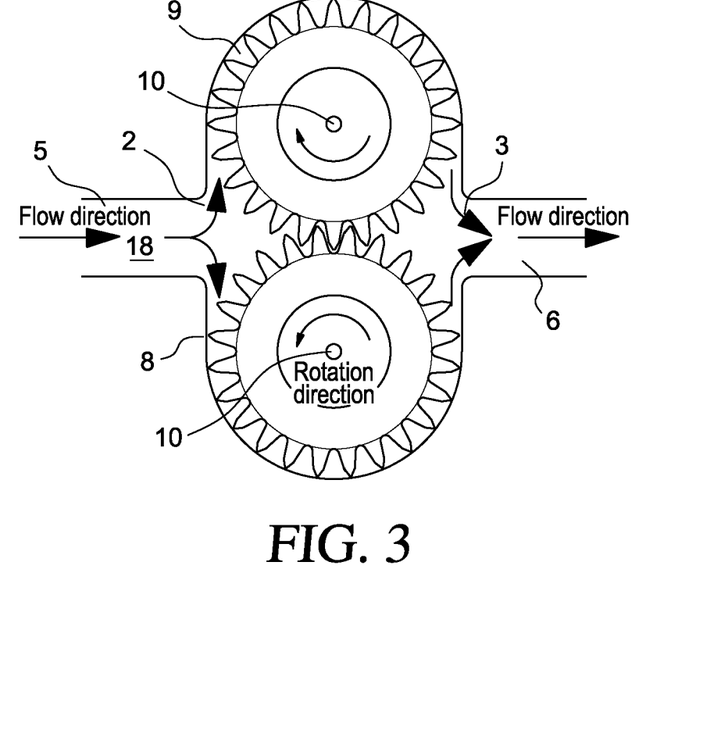
FIG. 3 illustrates a representation of fluid flow around the gears according to the invention.

FIG. 2 is a schematic view of an exemplary embodiment of the invention. As shown in FIG. 1, the fluid monitoring unit 1 has an inlet 2 and an outlet 3 for the passage of fluid, with a check valve 4 and a flexible or rigid tube 5 at the upstream (inlet) side of the fluid monitoring unit 1, and a flexible or rigid tube 6 attached to a mouthpiece (or valve such as a bite valve) 7 at the outlet 3. The inlet 2 and the outlet 3 are placed on opposite sides of the gears 9 to provide a fluid flow around the two gears, which in turn rotates the gears 9, as illustrated in FIG. 3. The mouthpiece or bite valve 7 attached to the outlet tube 6 is placed in the user's mouth allowing the user to draw fluid from the bladder or fluid container (not shown) that is attached to the inlet tube 5. Alternatively, the fluid monitoring unit 1 can be within the fluid container.

The check valve 4 only allows the flow of a fluid in one direction. In use the fluid flows from the bladder or fluid container, through the check valve 4 and fluid monitoring unit 1, and to the user through the outlet tube 6 and mouthpiece 7. The check valve 4 prevents the flow of fluid in the opposite direction, i.e., from the fluid monitoring unit 1 and back through the check valve 4. Alternatively, the check valve 4 could be relocated or a second one added on the outlet 3 side. The exemplary embodiments of the check valve 4 allow for improved accuracy by helping to prevent the gears 9 from rotating in an opposite direction.

The check valve 4 is an important feature of this exemplary embodiment of the invention. When the user draws some fluid 18 from the bladder or fluid container, pulses representing the fluid flow are produced by the gear rotating through a detection axis of sensor 12. Without the check valve 4, when the user is finished, fluid would flow back in the reverse direction causing the gear to rotate in the opposite direction and causing the sensor 12 to count the number of teeth of gear 9. This reverse flow would yield inaccurate results because the sensor 12 of this particular embodiment cannot differentiate between flow directions and reacts equally to flow in either direction. The check valve 4 inhibits this backflow problem and results in a highly accurate sensing system. Of course, alternative sensor, gear and circuitry arrangements capable of distinguishing between flow directions are known to those of ordinary skill in the art. Those arrangements are compatible with and capable of use with the current invention. However, the check valve 4 offers a simple alternative to such arrangements.

In use, a user applies his or her mouth to the outlet tube 6 or mouthpiece 7 and begins to drink. That drinking or sucking action causes fluid to flow through the flow monitoring unit 1, as illustrated in FIG. 3. The fluid 18 is drawn from a container (not shown) and enters an inlet tube 5 (which may be omitted) that is connected to an inlet 2 of the fluid monitoring unit 1. The fluid 18 then flows around the perimeter of the sensor housing 8 such that gears 9 are rotated toward the incoming inlet fluid flow 18 along an axis connecting the inlet 2 and outlet 3 of the housing 8, as illustrated in FIG. 3. A small gap 11 is present between the perimeter of housing 8 and the gears 9. The gears 9 are designed to engagingly interact with each other to prevent fluid from flowing between the gears 9. This design and interaction of the gears 9 causes the fluid 18 to flow around the perimeter of the housing 8 instead of flowing along a central axis connecting the inlet 2 and outlet 3 of the housing 8. As the gears 9 are rotated by the fluid 18, their rotation may be sensed in a suitable manner herein described below. This arrangement has been found to produce greater accuracy at varying flow rate ranges, particularly very low flow rates.

Again referring to FIG. 1, an exemplary embodiment of the fluid monitoring unit 1 includes a housing 8, precision molded gears 9, stainless steel axles 10, and a sensor 12 such as the illustrated light emitting diode (LED) 12B and a phototransistor 12A that sense the rotation of at least one of the gears 9 to indicate fluid flow. The housing 8 may be constructed of various materials, including clear or opaque materials that allow the sensors 12 to be placed either on the interior or exterior of the housing while still being capable of sensing the rotation of the gears 9. This also allows for visual analysis of the flow of fluid through the housing 8.

The gears 9 preferably have a density similar to the density of water, which allows the gears 9 to slide or float up and down on axles 10. This sliding action allows the device to flush any particulates out of the housing 8 as the fluid being consumed passes around the gears 9. In addition, the gears 9 are preferably designed and arranged to have low frictional resistance with respect to the axles 10 and the other gear 9 (at the interaction of the teeth of gears). These gear characteristics and the analysis involved in optimizing these gear characteristics will be discussed in greater detail below.

The sensors 12A, 12B while shown in the exemplary embodiment to comprise an LED and phototransistor, may include a variety of sensor arrangements. For example, the sensor arrangements may also be of the optical/photo type, transmitter/receiver type, or magnetic induction type. The light source 12A may also be one or more of the following: a light emitter, a photoemitter, or a semiconductor die. The phototransistor 12B may be one of the following: photoelectric receiver, photodetector, or a semiconductor die. The sensors 12A, 12B may also have their respective locations reversed or relocated as long as a beam of light is capable of traveling between them when a gear tooth is not present.

The sensor (or rotation monitoring system) 12 may alternatively be a magnetic type sensor, such as a reed switch or Hall Effect type sensor. These magnetic sensors detect the presence of a magnet or magnetic field near the sensor. In order to provide a magnetic field suitable for this sensor type, a magnet may be embedded in at least one of the gears. For example, a magnet may be embedded in at least one of the teeth of at least one gear such that the sensor detects the presence of the magnet upon passing the sensor. Alternatively, at least one of the teeth of at least one gear may be impregnated with magnetic particles suitable to be sensed upon passing the sensor. To improve accuracy, each tooth of one gear will have magnetic material.

Figure 4:
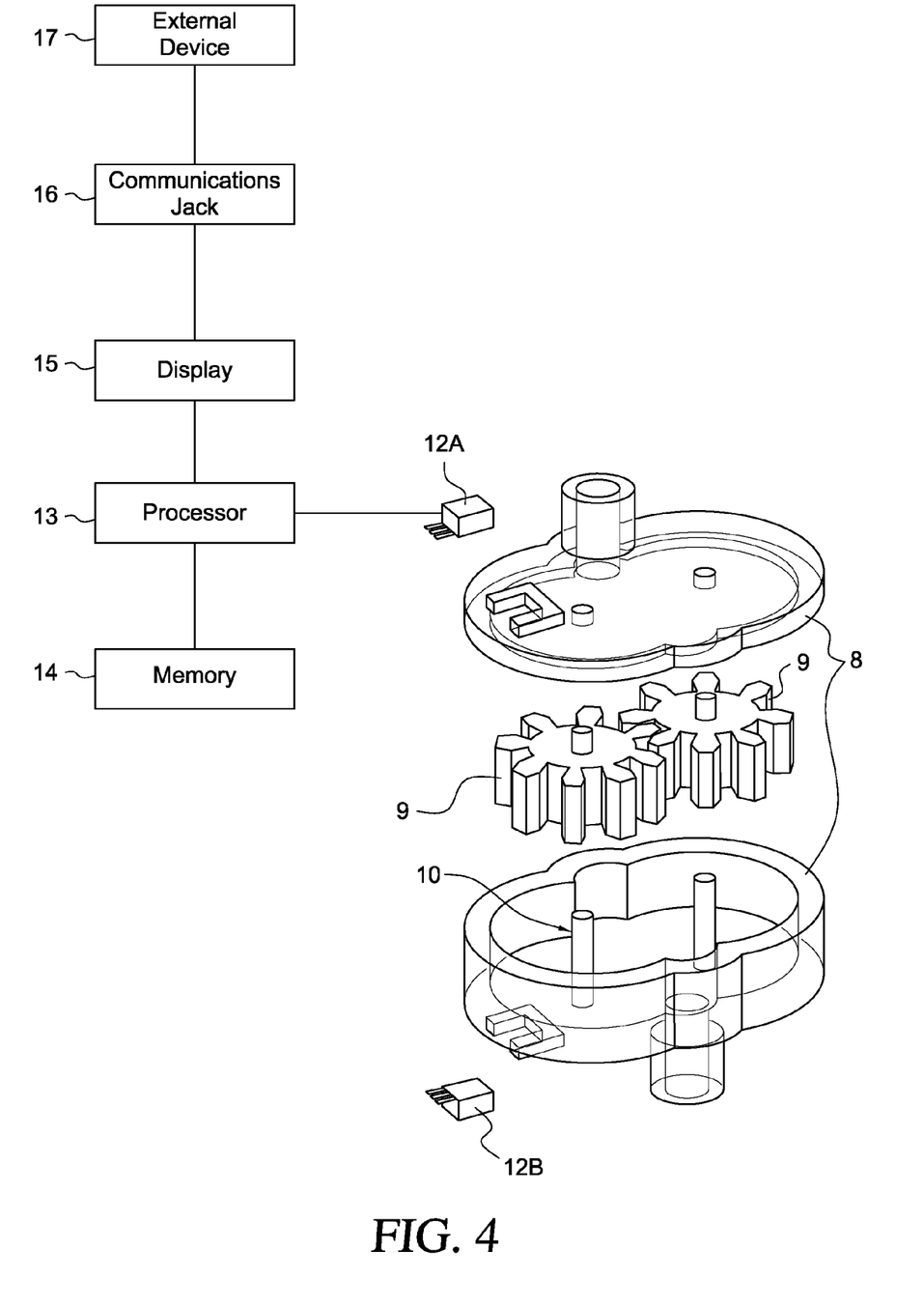
FIG. 4 illustrates a representation of an exemplary embodiment including processing components and exploded view of mechanical components.

As illustrated in FIG. 4, the sensor output of the system for sensing gear rotation in at least one exemplary embodiment is sent to a processor 13 (such as a programmable microprocessor or ASIC), including memory 14, data storage, and data output to a display 15 such as a liquid crystal display (LCD). The sensor output may also be sent to a communications jack 16 capable of communicating with an external personal computer (or other processing device) 17 or other similar means of data transmission or display, as illustrated in FIG. 4. The processing device 17 may be external to the user or also worn by the user. Although the display 15 and the communications jack 16 are illustrated as being connected in series, they could be connected in parallel or one or the other omitted from the device.

The processor 13 processes the signal provided by the sensor 12 and translates the signal into meaningful information such as the fluid consumption of the user and the rate of fluid consumption over at least one period of time. In at least one exemplary embodiment, the processor 13 compares the data against norms such as standards or predetermined consumption rates to see if the user is consuming the correct amount of fluid, and if not can have the display 15 alert the user or provide other notifications such as an audible alarm through, for example, a speaker and/or vibration through, for example, a piezoelectric. The processor 13 may also transmit the data or other information via the communications jack 16 to external devices or other devices worn by the user. The mechanism that provides this capability for the processor may be hardware and/or software.

In an exemplary embodiment with a communications jack 16, such as an RS-232 serial communications jack, an infrared source/detector, USB connector, wireless transmitter/receiver, or other physical connection, is electrically connected to the processor 13. The communications jack 16 permits communication between a processing device such as an external computer or central data collection device and the processor 13 via a communications jack 16. In exemplary embodiments, the data from the processor 13 can be displayed on a display 15, such as a LCD.

Figure 5A:
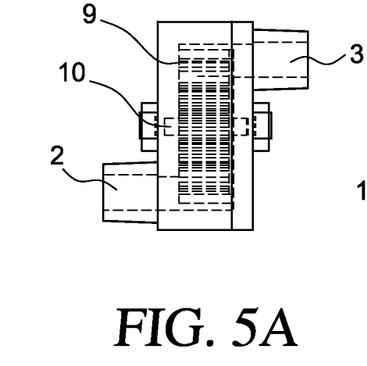
FIG. 5A illustrates a side view of an exemplary embodiment.
Figure 5B:
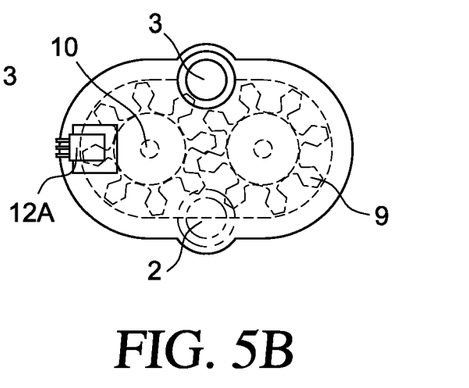
FIG. 5B illustrates a top view of an exemplary embodiment.

FIGS. 5A and 5B illustrate side and top views, respectively, of the invention including exemplary dimensions of the fluid monitoring unit 1. FIGS. 5A and 5B include the same elements as outlined above with respect to FIG. 1. FIGS. 5A and 5B list overall exemplary dimensions of the fluid monitoring unit 1 as being 0.34 inches in height (thickness), 1.07 inches in width, and 0.79 inches in depth. For these illustrated dimensions, it has been found that the gears 9 will rotate one full turn per about 0.20 cc of fluid flow, which means for each tooth by the sensor is another 0.025 cc in an eight tooth gear arrangement. Flow outputs based on these and other known dimensions allow for easy conversion of measured gear rotations into overall flow output. Based on these exemplary dimensions, a variety of scaling is possible.

Figure 6:
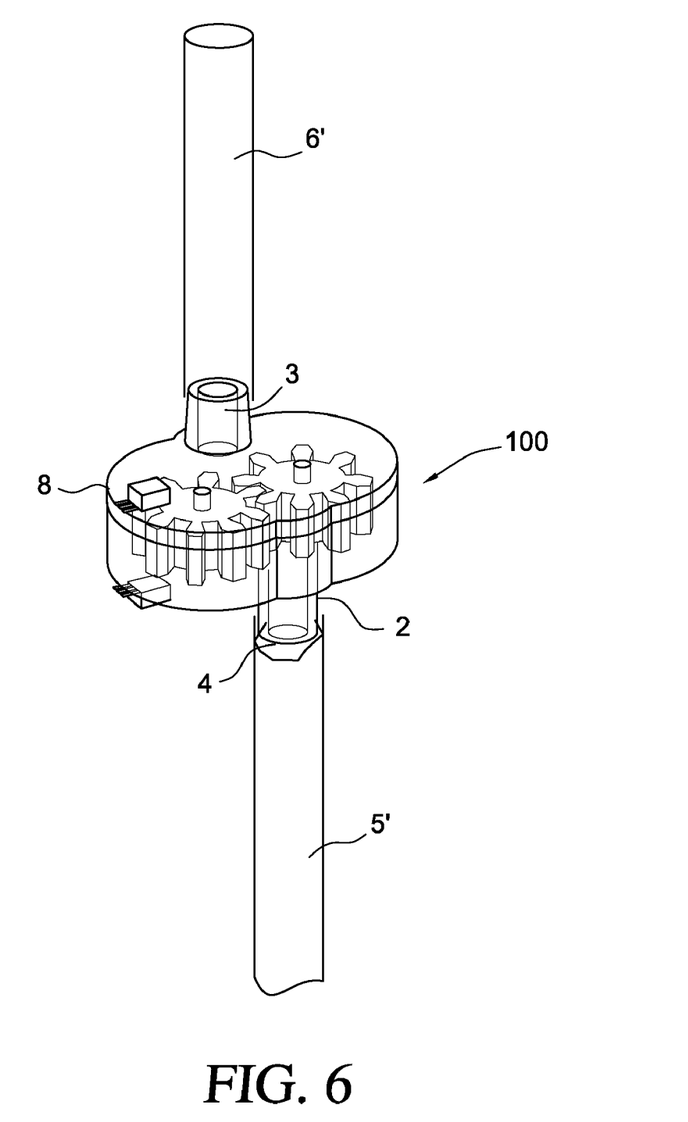
FIG. 6 illustrates an exemplary embodiment of an electromagnetic straw according to the invention.

In another exemplary embodiment of the invention, as illustrated in FIG. 6, the fluid monitoring unit can be used as a stand-alone "electromechanical straw" 100 capable of monitoring fluid consumed from any container. In this exemplary embodiment, the straw 100 may be utilized to consume and monitor fluid from a variety of containers, including open or partially sealed containers. The straw 100 functions much like a traditional drinking straw while providing the fluid monitoring benefit benefits of the fluid monitoring unit, i.e., providing accurate consumption information. The straw 100 allows a user to consume precise amounts of fluid from a variety of containers and fill levels, including large containers of unknown volume, partially filled volumes, etc.

The straw 100 includes a fluid monitoring unit and optional inlet and outlet straws 5', 6'. An inlet straw 5' may be connected to the inlet 2 of the sensor housing 8. An outlet straw 6' may be connected to the outlet 3 of the sensor housing 8. The lengths of the inlet straw 5' and the outlet straw 6' may be selected to suit the appropriate needs of the particular use. The straw 100 also includes a check valve 4 attached to the inlet 2. The straw may optionally include a bite valve (not shown) connected to the end of the outlet straw 6'. Also, as the fluid monitoring unit is capable of being fully submersed in fluids suitable for human consumption without damage or loss of accuracy, either straw may also be eliminated. For instance, the fluid monitoring unit may be fully submersed in the fluid while having, for example, only an outlet straw 6'.

In order to more fully disclose the present invention, certain underlining principles related to various aspects of the invention are outlined below.

As a general rule, the maximum suction that can be applied by an individual without the individual experiencing immediate discomfort is about 20-25 kPa or $\frac{1}{5}$ to $\frac{1}{4}$ of atmospheric pressure. Therefore, it should be possible for an individual to raise water about 2.5 meters by sucking on a tube without experiencing great discomfort or pain. Typically, sipping through a straw or short tube requires a suction of no more than 2 kPa to raise the water and to overcome flow resistance. This is the range that feels normal for sipping a fluid with a density and viscosity of water. The amount of water that can be taken into the mouth in a single sip ranges from about 2 to 50 ml. The upper limit is determined by the available volume of the mouth. The lower limit appears to depend on how quickly one can stop sipping after sensing that the fluid has reached the mouth. A large mouthful of water can be sipped through a straw in as little as two seconds. Thus the upper limit for fluid flow appears to be on the order of 25-50 ml/sec. Since small sips appear to have very intermittent flow, it is more difficult to accurately determine a lower limit. Choking (water entering the trachea) seems to be much less common while sipping than while drinking. This goes against the thinking that the sucking action should tend to draw toward the trachea. However, the most reliable evidence points to strong involuntary choking prevention mechanisms while sipping/sucking that do not work as well during regular drinking.

Geometric Parameters for Analysis of Flow in a Gear Meter.

The geometry of the gears and the clearances between the gears and the housing must be taken into account when analyzing the flow in a gear meter. For this analysis, it is assumed that the gears have standard involute-profile teeth with a 20 degree contact angle. This is not optimum, but is provides a simple basis for determining tooth size. The gear parameters are then:

PD—pitch diameter
OD—outside diameter
RD—root diameter
t—thickness
W—tooth crown width
n—number of teeth
BD—bore diameter (approximately equal to the shaft diameter)

Normal PD, OD, and W are determined from n, the gear pitch or module, and standard tooth profile values. For this analysis it is easier to calculate these separately and then work with simple dimensional values.

The housing clearance parameters are:

C1—the clearance between the gear teeth crowns and the housing wall

C2, C3—the clearance between the end faces of the gears and the housing m—the number of teeth on each gear that are in close proximity to the wall at anytime For simplicity, it is assumed that the center-to-center spacing of the gears is equal to PD. It is also assumed that there is little backlash between the gears and that the space between meshed gear teeth is very small so that very little fluid will be carried "backwards".

Estimation of "Leakage" Flow Around the Gears

For laminar flow between parallel plates, the flow rate Q and the pressure drop $\Delta p$ can be related by a fluid resistance defined as:

$$R_f(b, h, L, \mu) = \frac{12 \cdot L \mu}{b \cdot h^3}$$

where h is the distance between the plates, b is the width of the plates, L is the length in the direction of flow, and $\mu$ is the viscosity of water, which at 20 degrees Celisus is 0.001 kg/m·s. Series and parallel resistance can be combined in the same way as for an electrical circuit.

For "leakage" flow around a circumference on the gears, the gap between each tooth crown and the housing wall can be modeled as laminar flow between parallel plates. Since the flow passes through the gaps in series the resistances can be multiplied by the number of teeth in the narrow flow path:

$$R_{circ} = m \cdot R_f$$

The "leakage" flow over the gear ends is more complex because the face between the gears and the housing is circular. This can be approximated as the flow between rectangular plates, where the width of the flow is PD and the length of the flow no more than PD and no less than the length of the mesh line between the gears. For small gears the length of the mesh line can be estimated as the length of two gears:

$$2 \cdot \frac{\Pi \cdot PD}{n} \leq L_m \leq PD$$

In the worst case (maximum leakage) the gears are resting against one wall, creating one larger side gap instead of two small ones. The flows over the circumference and sides of two gears are all in parallel so the combined resistance is:

$$R_{leakage}(T, C1, W, PD, C2, L_m, \mu) = \frac{1}{\frac{2}{R_f(T, C1, W, \mu)} + \frac{2}{R_f(PD, C2, L_m, \mu)}}$$

For a prototype gear meter:

T=0.30 in

PD=0.60 in

OD=0.685 in

RD=0.480 in

BD=0.063 in

C1=0.005 in

W=0.05 in n=12

C2=0.008 in $\Delta p = 1 \times 1000 \times Pa$ (1 kPa is approx. normal sipping pressure)

T=7.62×10$^{-3}$ m

PD=0.015 m

OD=0.017 m

RD=0.012 m

BD=1.6×10$^{-3}$ m

C1=1.27×10$^{-4}$ m

W=1.27×10$^{-3}$ m

C2=2.032×10$^{-4}$ m

For the minimum value of $L_m$:

$$L_m = 2 \cdot \frac{\Pi \cdot PD}{n}$$

$$L_m = 7.98 \times 10^{-3} \text{m}$$

$$Q = \frac{\Delta p}{R_{leakage}(T, C1, W, PD, C2, L_m, \mu)}$$

$$Q = 4.719 \times 10^{-6} \frac{m^3}{s}$$

$$Q = 4.719 \frac{ml}{s}$$

For the maximum value of $L_m$:

$$L_m = PD$$

$$L_m = 0.015 \text{ m}$$

-continued $$Q = \frac{\Delta p}{R_{leakage}(T, C1, W, PD, C2, L_m, \mu)}$$

$$Q = 3.447 \times 10^{-6} \frac{m^3}{s}$$

$$Q = 3.447 \frac{ml}{s}$$

These flow rates are high enough to have the potential to produce significant errors. It should also be noted that the viscosity of water decreases by one-third at a temperature of 40 degrees Celsius—a condition that could easily exist in hot weather and which would not result in higher flow rates. It is therefore important that the gear meter has a very low pressure drop, both to start and to continue the flow, so that only a small part of the total flow is "leakage".

Start Up of Gear Meter

When the gears are not turning and fluid pressure is applied, static friction must be overcome to begin rotation. It can be very difficult to predict the coefficient of static friction because the gears are immersed in fluid. The gears are small and their density is close to that of water so gravity forces will have little effect of removing the water film between the contacting surfaces. Effects of surface wetability and adhesion may be much more important on this scale and depend greatly on materials and manufacturing processes employed.

If it is assumed a use of molded gears, shafts, and housings then the static friction coefficient ($f_s$) should be less than 0.2 for dry surfaces and as low as 0.05 for wet surfaces.

Figure 7A:
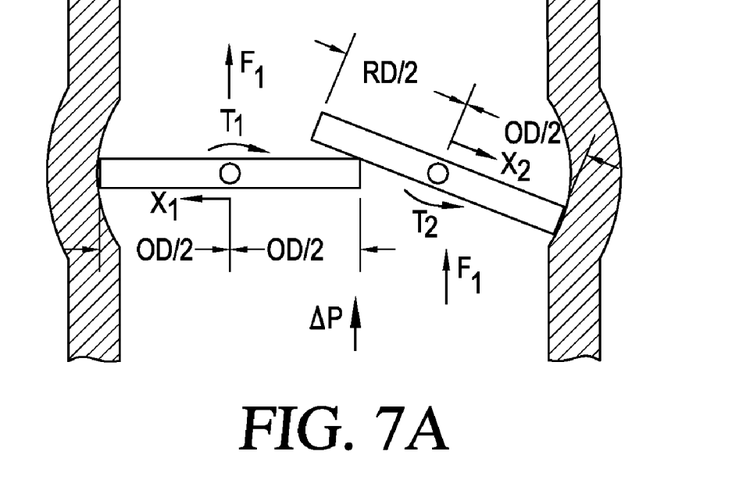
FIG. 7A illustrates an exemplary prototype used for gear analysis.
Figure 7B:
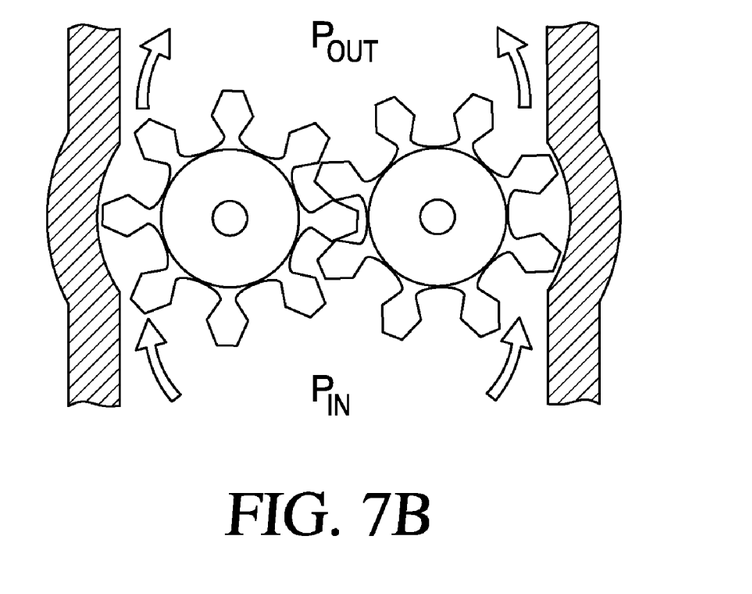
FIG. 7B illustrates an exemplary prototype used for gear analysis.

FIGS. 7A and 7B show the general configuration of the gears and housing. For the gears to rotate with the flow of fluid a torque must be applied to them. As can be seen in FIG. 7B, the fluid pressure is distributed over a number of complex surfaces. However, most of the pressures cancel out. FIG. 7A shows a simplified model of the forces and torques on the gears at a typical rotational position. It can be seen that the left-hand element is completely exposed to the pressure drop $\Delta P$ while a part of the right-hand element, equivalent to one gear tooth, is isolated from the pressure drop.

The total force on the gears due to fluid pressure is:

$$F(\Delta P, OD, RD, t) = \Delta P \cdot t \cdot \left(3 \cdot \frac{OD}{2} + \frac{RD}{2}\right)$$

The torque on the left hand element due to fluid pressure is 0. The torque on the right hand element is:

$$T_f(\Delta P, OD, RD, t) = \Delta P \cdot t \cdot \left[\left(\frac{OD}{2}\right)^2 - \left(\frac{RD}{2}\right)^2\right]$$

The opposing torque due to static friction on the gear shafts is approximately:

$$T_S(\Delta P, OD, RD, BD, t, f_S) = F(\Delta P, OD, RD, t) \cdot f_S \cdot \frac{BD}{2}$$

where $f_s$ is the static friction coefficient.

The gears will turn if $$\frac{T_f}{T_S} > 1.$$

It can be seen that this is independent of pressure and gear thickness and depends only on geometry and friction. The ratio of the torques is given by:

$$R_T(OD, RD, BD, f_S) = \frac{\left(\frac{OD}{2}\right)^2 - \left(\frac{RD}{2}\right)^2}{\left(3 \cdot \frac{OD}{2} + \frac{RD}{2}\right) \cdot f_S \frac{BD}{2}}$$

For the prototype gear meter, using the minimum and maximum values for $f_s$:

$$R_T(OD, RD, BD, 0.2) = 7.477$$

$$RT(OD, RD, BD, 0.05) = 29.908$$

This shows that friction on the gear shafts should never prevent the gears from turning. This result does not take into account effects due to adhesion between the surfaces. There is also a component of sliding friction between the gear teeth that will normally be very small but will be significant if the gear teeth are rough or binding.

Some other observations may be made of the equations above, including:

a) The torque ratio will increase as the relative difference between OD and RD increases. This occurs as the number of teeth in the gear decreases. Therefore, the gears should have as few teeth as possible, subject to other constraints.

b) The torque ratio will increase as the relative difference between OD and BD increases. This means that the bore and shaft diameters should be as small as possible. The minimum shaft diameter will be limited by the manufacturing process, the materials, and the required life of the gear meter.

c) The above analysis provides a reasonable estimate for the case when the gears are turning continuously, except that $f_d$, the dynamic friction coefficient, is used instead of $f_S$. The gears are effectively turning on a fluid filled journal bearing with very low side loads. Under this condition, the friction coefficient will be very low.

Sizing of the Gear Meter

It is desirable to make the gear meter as small as possible. However, if the gears are too small, the pressure drop across the meter will increase and greater suction will be required to sip the water. Conservatively, the pressure drop will be relatively small if the water travels through the gear meter at approximately the same velocity as through the connecting tube. This requires that the equivalent cross section areas be the same.

The gears rotate so that their peripheral velocity is approximately equal to the water velocity. The effective cross section of the path through which the water flows around the gear teeth is approximately:

$$A_g(OD, RD, t) = \left(\frac{OD}{2} - \frac{RD}{2}\right) \cdot t$$

This is effectively the area swept out by each moving tooth. The gear teeth themselves fill about one half of the flow path, effectively halving the cross section area. The above equation is for flow past two gears, so the factor of ½ disappears. The typical tube diameter and cross section area are:

$$D_{tube} = .2 \text{ in. or } D_{tube} = 5.08 \times 10^{-3} m$$
$$A_{tube} = \Pi \cdot \left(\frac{D_{tube}}{2}\right)^2$$
$$A_{tube} = 2.027 \times 10^{-5} m^2$$

For an 8 or 9 tooth gear of the same general proportions as that illustrated, for example in FIGS. 1 and 2, the gear thickness is about twice the gear height $$\left(\frac{OD}{2} - \frac{RD}{2}\right),$$

so the cross section area of the flow around the gears becomes:

$$Ag(t) = \frac{t^2}{2}$$

Equating the two areas gives a minimum gear thickness of:

$$t_{min} = \sqrt{\Pi \times \frac{D_{tube}^2}{2}}$$
$$t_{min} = 6.367 \times 10^{-3} m \text{ or } t_{min} = 0.251 \text{ in.}$$

The estimated tooth height is 0.125 in. A standard 9-tooth, 20-pitch gear has a tooth height of 0.112 in. and has a OD of 0.50 in. Therefore, a conservative estimate for the minimum allowance gear size of 0.50 in. diameter×0.25 in.—about 20% smaller than the illustrated gears in FIG. 1. With additional testing and perhaps a modified gear profile, this could almost certainly be further reduced.

While the invention has been described with reference to certain preferred embodiments, numerous changes, alterations and modifications to the described embodiments are possible without departing from the spirit and scope of the invention, as defined in the appended claims and equivalents thereof. The locations and configurations of sensors, sources, and ports described above and illustrated are exemplary and for illustration only.

The exemplary and alternative embodiments described above may be combined in a variety of ways with each other without departing from the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The foregoing description describes different components of exemplary embodiments being "connected" to other components. These connections includes physical hardwired connections, wireless connections, magnetic connections, and other types of connections capable of carrying digital and/or analog information between the components.

Although the present invention has been described in terms of particular embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the embodiments described above can be configured without departing from the scope and spirit of the invention. Therefore, it is to be understood that, within the scope of the appended claims, the invention may be practiced other than as specifically described herein.

What is claimed is:

1. An apparatus for monitoring the amount of fluid consumed by a user from a fluid container, comprising:
   a first tube capable of communicating fluid from a fluid container;
   a fluid monitoring unit connected to said first tube, said fluid monitoring unit including
      a housing having a fluid inlet and a fluid outlet,
      a first gear arrangement disposed within said housing,
      a second gear arrangement disposed within said housing, wherein said first gear arrangement and said second gear arrangement are disposed adjacent to and in interlocking communication with each other, and
      a sensor connected to said housing; and
   a second tube connected to said fluid monitoring unit,
   wherein said fluid monitoring unit accurately measures the amount of fluid consumed by a user over the full range of human consumption.

2. The apparatus of claim 1, wherein said first gear arrangement and said second gear arrangement cover substantially the entire internal cross-section of said housing.

3. The apparatus of claim 1, wherein said first gear arrangement and said second gear arrangement are provided with a small clearance with respect to each other.

4. The apparatus of claim 3, wherein said small clearance is approximately 0.01 inches.

5. The apparatus of claim 1, wherein said first gear arrangement and said second gear arrangement are provided with a small clearance with respect to said housing.

6. The apparatus of claim 5, wherein said small clearance is approximately 0.01 inches.

7. The apparatus of claim 1, wherein said sensor includes
   a light source, and
   a light detector positioned such that light passing between them is interruptible by at least one tooth of one of said first gear arrangement and said second gear arrangement.

8. The apparatus of claim 1, further comprising
   at least one magnet embedded in at least one of said first gear arrangement and said second gear arrangement; and
   a Hall effect sensor connected to said housing.

9. The apparatus of claim 1, further comprising
   a processor connected to said sensor for receiving a signal indicative of gear rotation representing fluid consumption, and
   a memory connected to said processor.

10. The apparatus of claim 9, wherein said processor having
    means for determining fluid consumption, and means for notifying the user if consumption is outside norms.

11. The apparatus of claim 9, further comprising a communications jack connected to said processor.

12. The apparatus of claim 9, further comprising a display connected to said processor.

13. The apparatus of claim 1, further comprising a valve connected to said second tube.

14. The apparatus of claim 13, wherein said valve is a bite valve.

15. The apparatus of claim 1, further comprising a check valve between said housing and said first tube.

16. The apparatus of claim 1, further comprising a check valve between said housing and said second tube.

17. The apparatus of claim 1, wherein said gears are able to slide along said respective axle.

18. An apparatus for measuring the amount of fluid consumed by a user, comprising:
   at least one straw; and,
   a fluid monitoring unit connected to said at least one straw, said fluid monitoring unit comprising:
      a housing having a fluid inlet and a fluid outlet,
      a first gear arrangement disposed within said housing,
      a second gear arrangement disposed within said housing, wherein said first gear arrangement and said second gear arrangement are disposed adjacent to and in interlocking communication with each other, and
      a rotation monitoring system connected to said housing, wherein said rotation monitoring system senses the movement of said first gear arrangement and said second gear arrangement and accurately measures the amount of fluid consumed by a user over the full range of human consumption.

19. The apparatus according to claim 18, wherein said fluid inlet and said fluid outlet are positioned such that fluid flows into said housing from said fluid inlet and along the perimeter of said housing towards said fluid outlet.

20. The apparatus according to claim 19, such that said first gear arrangement and said second gear arrangement rotate in response to the movement of fluid through said fluid monitoring unit.

21. The apparatus of claim 18, wherein at least one of said at least one straw is connected to said fluid inlet of said housing.

22. A fluid monitoring unit, comprising:
   a housing having a fluid inlet and a fluid outlet;
   a pair of axles within said housing;
   a first and second gear, with each gear in rotational communication with a respective axle and in interlocking communication with each other,
   wherein said first gear covers approximately a first half of said housing and said second gear covers approximately a second half of said housing, and
   a path for fluid exists from said fluid inlet through said housing along a perimeter of said first and second gears to said outlet such that said gears rotate in response to movement of fluid through said fluid monitoring unit; and
   a sensor connected to said housing to sense movement of at least one of said first gear and said second gear, wherein said sensor accurately measures flow rates over the range of human consumption, and wherein said fluid has a density and viscosity substantially similar to water.

* * * * *